United States Patent [19]
Kim

[11] Patent Number: 6,014,186
[45] Date of Patent: Jan. 11, 2000

[54] HIGH-SPEED MOTION VECTOR DECODING CIRCUIT

[75] Inventor: Je-ik Kim, Seoul, Rep. of Korea

[73] Assignee: Samsung Electronics Co., Ltd., Kyungki-do, Rep. of Korea

[21] Appl. No.: 08/827,068

[22] Filed: Mar. 26, 1997

[30] Foreign Application Priority Data

Mar. 26, 1996 [KR] Rep. of Korea .................... 96-8373

[51] Int. Cl.[7] ............................. G06T 7/20; H04N 7/50
[52] U.S. Cl. ................... 348/845; 348/845.2; 348/699; 382/236
[58] Field of Search ................... 348/699, 845, 348/845.2, 402, 413, 416; 382/236; H04N 7/50

[56] References Cited

U.S. PATENT DOCUMENTS

| 5,428,396 | 6/1995 | Yagasaki et al. | 348/416 |
| 5,671,024 | 9/1997 | Chun | 348/699 |

FOREIGN PATENT DOCUMENTS 2 287 602  9/1995  United Kingdom .......... H04N 7/26

OTHER PUBLICATIONS

International Standards Organization: "ISO/IEC CD 13818–2: Information Technology—Genetic coding of moving pictures and associated audio information–Part 2: Video" Dec. 1, 1993, Tokyo Japan XP002101939.

Ishihara K et al: "A Half–Pel Precision MPEG2 Motion–Estimation Processor with Concurrent Three–Vector Search" IEEE Journal of Solid–State Circuits, vol. 30, No. 12, Dec. 1, 1995, pp. 1502–1508, XP000557256.

*Primary Examiner*—Howard Britton
*Attorney, Agent, or Firm*—Sughrue Mion, Zinn, Macpeak & Seas, PLLC

[57] ABSTRACT

A high-speed motion vector decoding circuit which decodes a motion vector formatted according to the MPEG-2 standard. The motion vector decoding circuit implements a motion vector decoding method on dedicated hardware including a pipeline structure. The hardware includes a parameter store for storing the input motion vector decoding parameters, that is, a motion vector range determination code, a motion vector code, and a motion vector residual code. The hardware also includes a motion vector decoder for storing motion vector to be decoded as a previous motion vector and decoding the motion vector using the parameter stored in the parameter store and the previous motion vector, a dual primer for receiving the previous motion vector stored in the motion vector decoder and generating a predetermined number of dual motion vectors, and a motion vector controller for controlling the operations of the decoder via the input parameters, and selecting and outputting the previous motion vector or the dual motion vector, as a finally decoded motion vector. A six-clock period of time is needed to decode one motion vector, and a 6+(n−1)-clock period of time is needed to decode n motion vectors via the pipeline structure, which enables the decoding circuit to be applied to a high-speed system such as a high-definition television.

17 Claims, 3 Drawing Sheets

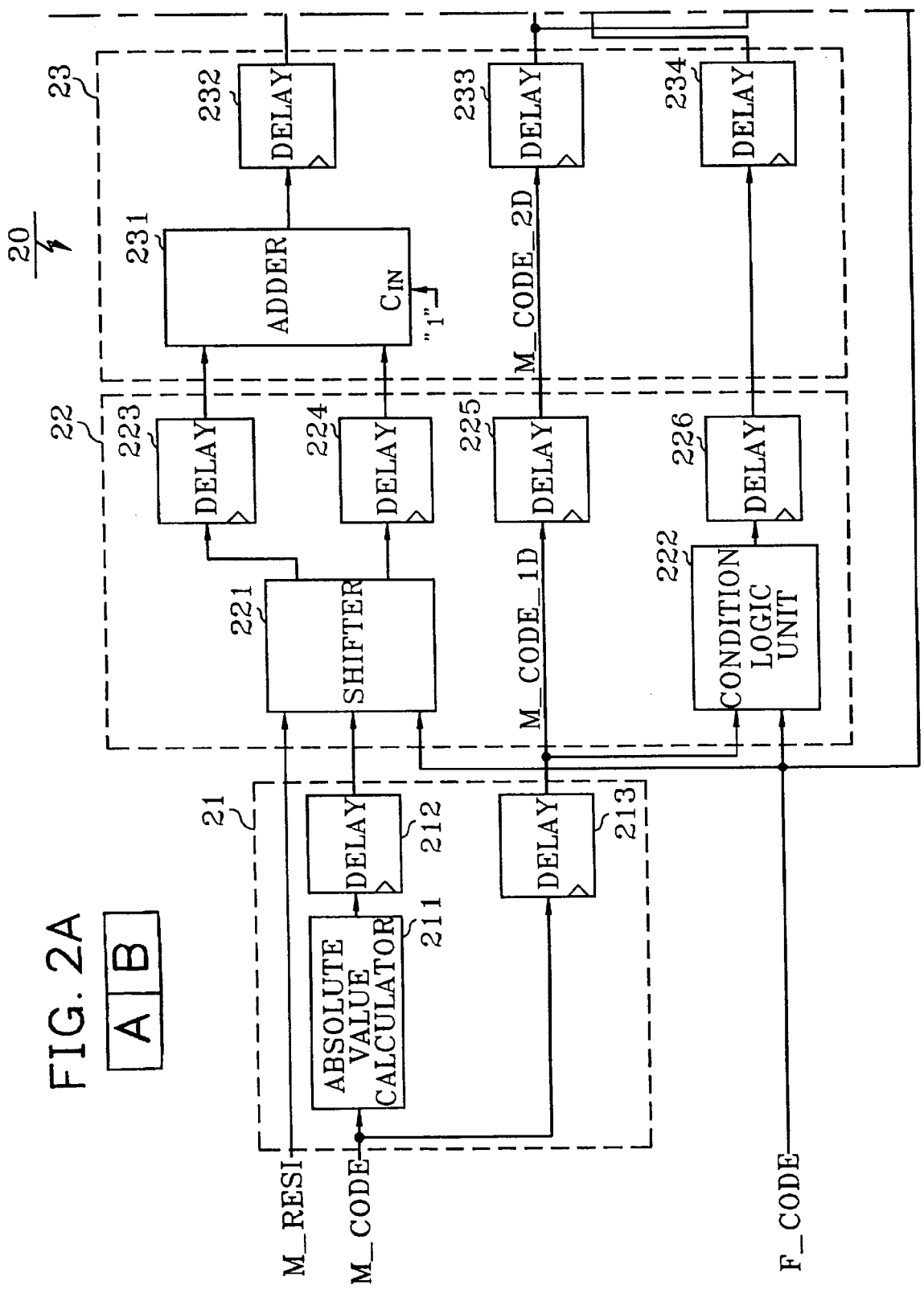
FIG. 2A  A|B

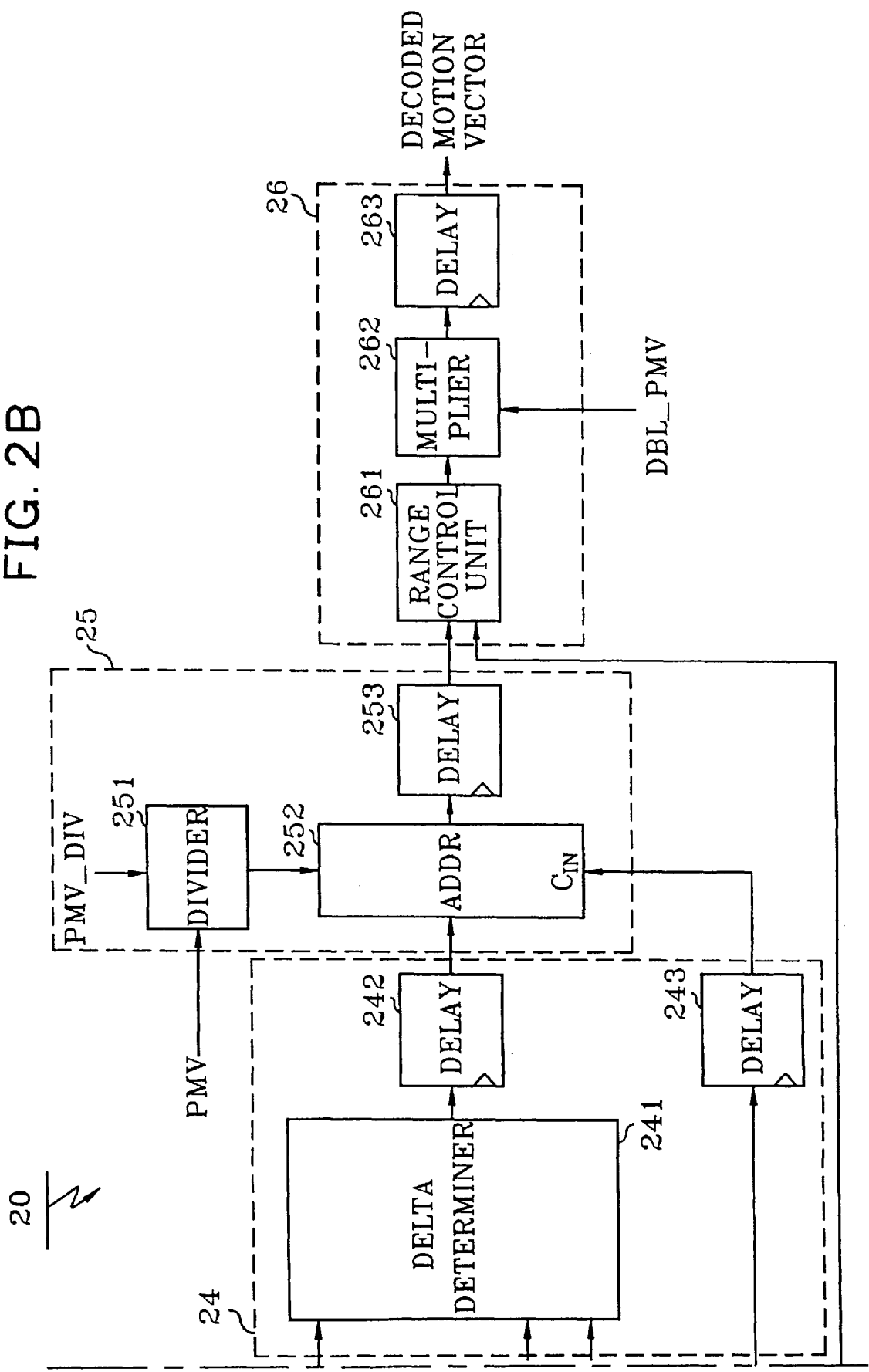

6,014,186

HIGH-SPEED MOTION VECTOR DECODING CIRCUIT

BACKGROUND OF THE INVENTION

The present invention relates to a motion vector decoding circuit, and, more particularly, to a motion vector decoding circuit which can be applied to a system such as a high-definition television (HDTV) for decoding motion vectors at high speed.

In a general image signal processing apparatus, a continuous digital image signal, such as that found in a HDTV, a digital VTR, or a multi-media system, is compressed using one of various encoding methods in order to transmit data more efficiently. Differential pulse coded modulation (DPCM) is one of the various encoding methods used to encode digital image signals. This method is based on a correlation of data between adjacent frames of images. In the DPCM method, a difference signal corresponds to a certain amount of data being generated to represent a mass of movement within regions between temporally adjacent frames. In contrast, there is no difference signal if the regions lack movement (i.e., portray the same image).

However, according to a motion compensated DPCM method, the certain amount of data can be reduced by finding the most similar segment in an adjacent frame to an image of a particular segment of a current frame, and encoding the image difference between these two segments. The motion compensated DPCM method encodes difference data between each segment of the current frame and the corresponding image segment of the adjacent frame, to thereby improve the transmission efficiency.

A motion vector used for the motion compensated DPCM method represents a direction and magnitude of movement between the image segments of the adjacent frame and the current frame in which the difference signal corresponding to the image segments of the current frame and the adjacent frame is smallest. The motion vector is encoded prior to being transmitted. An example of encoding the motion vector will be described as follows.

When the motion vectors are 3, 10, 30, 30, −14, −16, 27 and 24, the difference between two adjacent motion vectors, which is referred to as delta, becomes 3 (i.e., 3-0), 7 (i.e., 10-3), 20 (i.e., 30-10), 0, −44, −2, 43 and −3, respectively. When a motion vector is represented as 6 bits and the range of the motion vector is between −32 and 31, 48 bits are needed to represent 8 motion vectors. Thus, concerning difference data −44 and 43 exceeding the motion vector range between −32 and 31, the data −44 smaller than the minimum value −32 of the motion vector range is added to the value 64 of the motion vector range. That is, −44+64=20. The value 64 of the motion vector range is subtracted from the data 43 larger than the maximum value 31 of the motion vector range. That is, 43−64=−21.

A plurality of difference data which have been obtained is divided into a predetermined number of groups, and a residual code is allocated to each difference data in order to discriminate between various difference data belonging to the same group. Here, since the difference data of "0" has the highest probability, the residual code is not assigned thereto. To decode the encoded and transmitted motion vector, a conventional motion vector decoding operation is performed by a software conceptual method in a reduced instruction-set computer (RISC) or a microcontroller.

An image decoding system adapted in a HDTV system, as proposed by the MPEG-2 standard, requires a larger image size and a higher processing speed. Thus, the conventional software conceptual method is unacceptable as it places a great burden on the processor. Thus, a hardware apparatus is needed to reduce the burden imposed on the processor and exclusively perform a motion vector decoding operation.

SUMMARY OF THE INVENTION

To solve the above problem, it is an object of the present invention to provide a high-speed motion vector decoding circuit for decoding motion vectors at high speed by using dedicated hardware capable of parallel processing in, for example, a HDTV high-speed system adopting the MPEG-2 standards, in which parameters necessary for motion vector decoding are sequentially delayed and output via a pipeline architecture having delays.

To accomplish the above and other objects of the present invention, there is provided a high-speed motion vector high-speed decoding circuit. The decoding circuit includes an input port for receiving parameters necessary for motion vector decoding; a parameter store for storing the input parameters; motion vector decoding means for storing motion vector to be decoded as a previous motion vector and decoding the motion vector using the parameter stored in the parameter store and the previous motion vector; a dual primer for receiving the previous motion vector stored in the motion vector decoding means and generating a predetermined number of dual motion vectors; and a motion vector controller for controlling the operations of all the elements via the input parameters and selecting one between the previous motion vector and the dual motion vector, to output the selected result as a finally decoded motion vector.

BRIEF DESCRIPTION OF THE DRAWINGS

The preferred embodiments are described with reference to the drawings wherein:

FIGS. 2A and 2B are detailed block diagrams showing the motion vector decoder of FIG. 1.

DETAILED DESCRIPTION OF PREFERRED EMBODIMENTS

Figure 1:
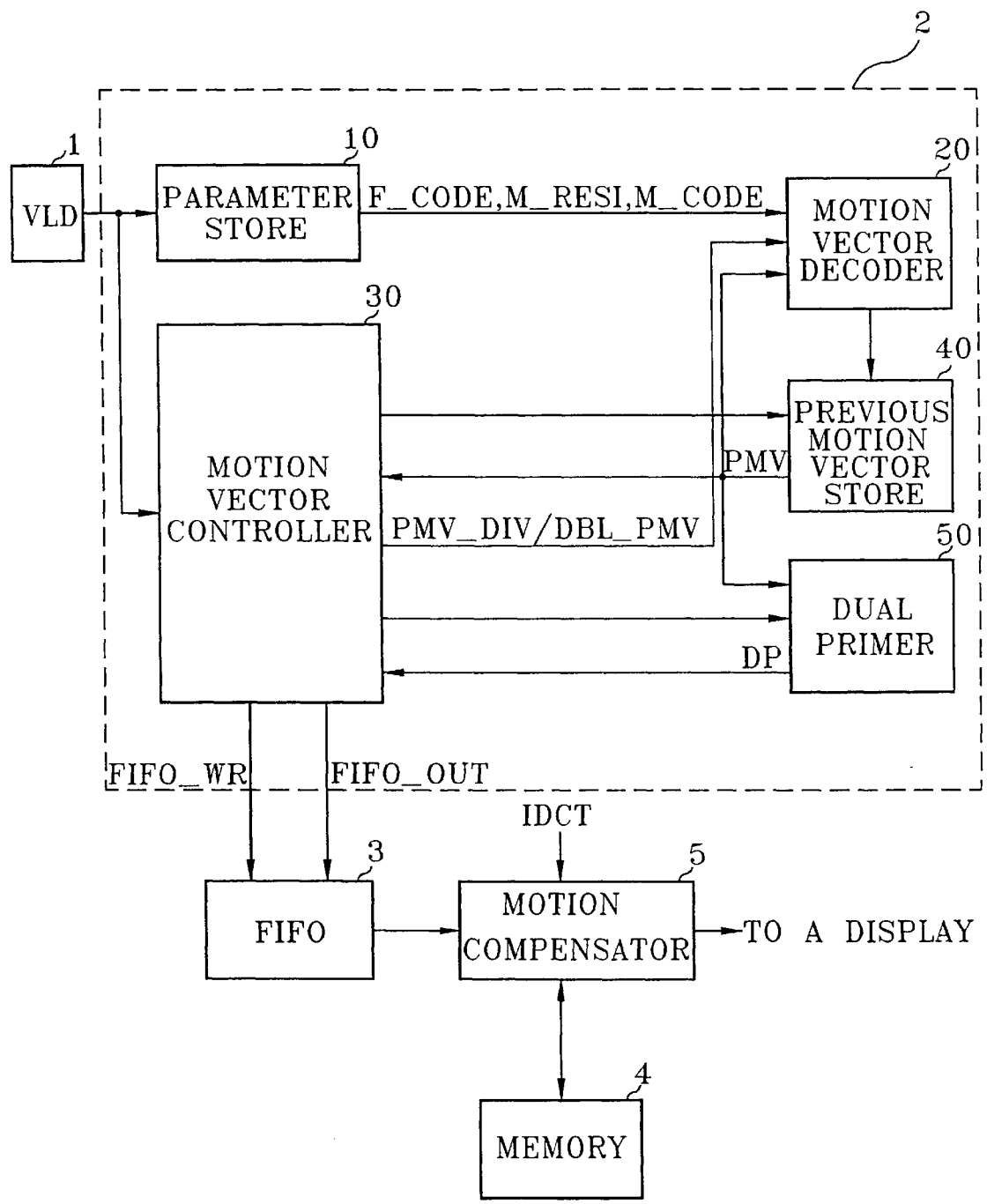
FIG. 1 is a block diagram showing an image decoding system adopting a high-speed motion vector decoding circuit according to the present invention.

A preferred embodiment of the present invention will be described in detail with reference to the accompanying drawings.

An image decoding system of FIG. 1 includes a high-speed motion vector decoding circuit 2 according to the present invention. The motion vector decoding circuit 2 receives parameters necessary for motion vector decoding and performs a motion vector decoding operation. The image decoding system also includes a variable length decoder (VLD) 1 for variable-length-decoding the received variable-length-encoded data, a first-in-first-out (FIFO) memory 3 for storing the decoded motion vector output from the motion vector decoding circuit 2, and a memory 4 for storing restored image data of at least one frame at a time. A motion compensator 5 performs a motion compensation operation using motion vectors, with respect to the outputs of an inverse-quantizer and inverse-discrete cosine transformer (IDCT) (not shown) and the image data stored in the memory 4. The IDCT outputs the inversely quantized and inversely discrete-cosine transformed data with respect to the variable-length-decoded data.

The motion vector decoding circuit 2 includes a parameter store 10 for storing parameters applied from the variable length decoder 1, and a motion vector decoder 20 for receiving the parameters and the previous motion vector, and for decoding the current motion vector. The motion vector decoding circuit also includes a previous motion vector store 40 for storing the decoded motion vector as a previous motion vector, a dual primer 50 for receiving the previous motion vector and generating a predetermined number of dual motion vectors, and a motion vector controller 30 for controlling each component of the circuit. A detailed construction of the motion vector decoder 20 is shown in FIGS. 2A and 2B.

Referring to FIGS. 2A and 2B, the motion vector decoder 20 implements a motion vector decoding method on dedicated hardware, in which the motion vector decoding method is described in section 7.6.3.1 of the document entitled "ITU-T H.262 ISO/IEC 13818-2 International Standard (March 1995, Lausan)."

The method is generally defined as follows:

```
r_size=f_code-1
f=1<<r_size
high=(16*f)-1;
low=(-16*f);
range=32*f;
if ((f==1) || (motion_coe==0))
    delta=motion_code;
else
    {delta=((abs(motion_code)-1)*f)+motion_residual+1;
    if (motion_code<0)
    delta=-delta;
    }
prediction=PMV;
if (mv_format==field) && (t==1) &&
            (picture_structure=frame_picture) )
    prediction=PMV DIV 2;
vector=prediction+delta;
if (vector<low)
    vector=vector+range;
if (vector>high)
    vector=vector-range;
if (mv_format==field) && (t==1) &&
(picture_structure=frame_picture))
    PMV=vector*2;
else
    PMV+vector;
```

Here, the operator "<<" means a shift left with zero fill, the operator "*" means multiplication, the operator "||" means a logical OR operation, the operator "&&" means logical AND operation, and the operator "==" means an equal to symbol.

In FIG. 1, the VLD 1 receives the encoded data and variable-length-decodes the received data, to generate variable-length-decoded image data and parity data, that is, parameters necessary for motion vector decoding. The image data output from the VLD 1 is supplied to the motion compensator 5 via the inverse quantizer (not shown) and the inverse DCT (not shown). Also, the parameters are applied to the parameter store 10 and the motion vector controller 30 in the motion vector decoding circuit 2. The parameter store 10 stores the applied parameters, including code (f_code) for determining a motion vector range, a motion vector code (m_code), and a motion vector residual code (m_resi). The motion vector decoder 20 reads the parameters stored in the parameter store 10 under control of the motion vector controller 30 and performs a motion vector decoding operation. The motion vector decoder 20 will be described below referring to FIGS. 2A and 2B.

In FIG. 2A, the motion vector decoder 20 first reads a motion vector code (m_code) among the parameters stored in the parameter store 10. Delays 213, 225, 233 and 243 constitute a pipeline structure for delaying the incoming motion vector code (m_code) by one clock pulse and for outputting the delayed result. During the time when the input motion vector code (m_code) is delayed by one clock pulse by the delay 213, an absolute value calculator 211 determines an absolute value of the motion vector (m_code), and subtracts "1" from the absolute value. A delay 212 delays the subtracted result and outputs the result to a first delta calculator 22. At this time, the motion vector code (m_code_1d) delayed by one clock pulse in the delay 213 is also output to the first delta calculator 22.

Then, the motion vector decoder 20 reads the motion vector residual code (m_resi) and the motion vector range determination code (f_code) from the parameter store 10 and applies the same to the first delta calculator 22. The motion vector range determination code (f_code) is also applied to a range controller 26. During the time when the delay 225 receives the one-clock delayed motion vector code (m_code_1d) and delays the received code by one clock pulse again in the first delta calculator 22, a shifter 221 subtracts "1" from the applied motion vector range determination code (f_code), obtains the number of effective bits of the motion vector residual code (m_resi), left-shifts the obtained result to make it two-times the number (f) of bits, multiplies the obtained number of bits by the absolute value of the motion vector code applied from the delay 212, and then outputs the multiplied result to a delay 224. The delay 224 delays the input data and outputs the delayed result to a second delta calculator 23. The shifter 221 also masks the residual bit portion except for the effective bit portion, as "0" in the applied motion vector residual code (m_resi) of a predetermined number of bits and outputs the masked result to a delay 223. The delay 223 delays the input data and outputs the delayed result to the second delta calculator 23. A condition logic unit 222 receives the one-clock delayed motion vector code (m_code_1d) and the motion vector range determination code (f_code) and logically processes these codes. The condition logic unit 222 outputs the motion vector code of "0" or a binary signal having a logic value of "1" when there is no motion vector residual code, or otherwise a logic value of "0" to the second delta calculator 23 via a delay 226.

An adder 231 in the second delta calculator 23 receives the respective outputs of the delays 223 and 224 and adds the outputs, to calculate a delta value by adding "1" applied to a carry input end Cin to the added result. The calculated delta value is delayed in a delay 232 and output to a delta determination portion 24. The delay 233 delays the motion vector code (m_code_2d) delayed by two clock pulses via the delays 213 and 225, by one clock pulse again, and outputs the delayed result to the delta determination portion 24. The delay 234 receives the binary signal from the delay 226 and delays the received signal by one clock pulse, to output the delayed result to the delta determination portion 24.

In the delta determination portion 24, a delta determiner 241 receives the calculated delta value and the motion vector code (m_code_3d) delayed by three clock pulses via the delays 213, 225 and 233, and selects one of the calculated delta value and the three-clock delayed motion vector code according to the input binary signal input from the delay 234 to determine the selected result as a final delta value. That is, the delta determiner 241 sets the calculated delta value as a final delta value if the binary signal is zero, and sets the three-clock delayed motion vector code as a final delta value if the binary signal is one. When the calculated delta value is determined as a final delta value, the delta determiner 241 reverses the sign of the finally determined delta value if the three-clock delayed motion vector code (m__code__3d) is smaller than zero. The sign of the delta value is reversed by inverting individual bits constituting the finally determined delta value. Here, a process of adding "1" to the inverted delta value is needed, which is performed by an adder 252 included in the motion vector determination portion 25. The delta value finally determined in the delta determiner 241 is output to the motion vector determination portion 25 via a delay 242. A delay 243 which receives the three-clock delayed motion vector code (m__code__3d) from the delay 233 delays a sign bit which is the most significant bit (MSB) of the motion vector code (m__code__3d) by one clock pulse and outputs the delayed result to the motion vector determination portion 25. The motion vector determination portion 25 receives the finally determined delta value via an adder 252 and receives the one-clock delayed sign bit via the carry input end Cin of the adder 252. A divider 251 divides the previous motion vector PMV read from the previous vector store 40 by "2" according to a control signal PMV__DIV applied from the motion vector controller 30 of FIG. 1, and outputs the result to the adder 252.

The motion vector controller 30 outputs a control signal PMV__DIV having a value of "0" or "1" to the motion vector decoder 20, according to whether a picture type is a frame structure, and a motion vector is used as a field and vertical component in the motion vector decoded data applied from the VLD 1. Here, the motion vector controller 30 also outputs another control signal DBL__PMV corresponding to the control signal PMV__DIV.

The divider 251, based on the control signal PMV__DIV, outputs the previous motion vector PMV to the adder 252 if the control signal PMV__DIV is "0", and divides the previous motion vector PMV by "2" to output the divided result to the adder 252 if the control signal PMV__DIV is "1". The adder 252 adds the previous motion vector PMV applied from the divider 251 and the finally determined delta value output from the delta determination portion 24, and adds a sign bit of the motion vector code applied via the carry input end Cin to the added result, to obtain a motion vector. The obtained motion vector is output to the range controller 26 via the delay 253.

The range controller 26 controls the range so that the motion vector exists within the boundary of the motion vector range determination code (f__code). For this purpose, the range control unit 261 compares the motion vector input from the delay 253 with the motion vector range determined according to the motion vector range determination code (f__code). Based on the result of this comparison, the range control unit 261 adds the motion vector range to the motion vector, if the motion vector is smaller than the minimum value of the motion vector range, and subtracts the motion vector range from the motion vector, if the former is greater than the maximum value of the latter, to thereby control the motion vector. The controlled motion vector is input to a multiplier 262. The multiplier 262 multiplies the controlled motion vector by "2" according to the control signal DBL__PMV when the divider 251 divided the previous motion vector PMV by "2", and outputs the controlled motion vector as a decoded motion vector via the delay 263 when the divider 251 outputted the previous motion vector PMV as it is. The decoded motion vector is stored in the previous motion vector store 40. Here, the operation of each component is accomplished within one-clock pulse, and a high-speed motion vector decoding operation is accomplished via a pipeline process. Thus, a six-clock period of time is needed to decode one motion vector, and only a thirteen-clock period of time is required to decode eight motion vectors via the pipeline processing method and apparatus.

Returning to FIG. 1, the motion vector output from the motion vector decoder 20 is stored in the previous motion vector store 40, and is used as a previous motion vector for obtaining a next motion vector. The previous motion vector PMV stored in the previous motion vector store 40 is output to the motion vector decoder 20, the motion vector controller 30 and the dual primer 50 under the control of the motion vector controller 30. The dual primer 50 produces a plurality of dual motion vectors DP using the previous motion vector PMV under the control of the motion vector controller 30 when the currently decoded motion vector is a predictive-picture (P-picture). The produced motion vectors are output to the motion vector controller 30. Since a technique for producing a plurality of the dual motion vectors DP in the dual primer 50 is well-known, the detailed description thereof will be omitted.

The motion vector controller 30 selects the dual motion vector DP input from the dual primer 50, if the kind of motion vector is determined to be a P-picture based on the parameters applied from the VLD 1. In the other cases, the controller 30 selects the previous motion vector PMV input from the previous motion vector store 40. The selected result is then stored in the FIFO memory 3. The FIFO memory 3 stores the selected motion vector according to a write control signal FIFO__WR generated by the motion vector controller 30, and outputs the stored motion vector to the motion compensator 5 in turn. The motion compensator 5 receives the image data designated by the motion vector among the restored image data of one frame stored in the memory 4 and adds the received data and the inverse-discrete-cosine-transformed image data, to then store and output the restored image data to the display.

As described above, the present invention relates to a high-speed motion vector decoding circuit, and uses dedicated hardware via a pipeline architecture. The pipeline architecture includes delays to enable the processing and decoding of a motion vector at high speed. As a result, the present invention can be used in a high-speed system such as a HDTV.

While only certain embodiments of the invention have been specifically described herein, it will apparent that numerous modifications may be made thereto without departing from the spirit and scope of the invention.

What is claimed is:

1. A motion vector decoding circuit comprising:
   an input port for receiving parameters for decoding motion vectors;
   a parameter store for storing said parameters;
   motion vector decoding means for storing a motion vector to be decoded as a previous motion vector and for decoding said motion vector based on said parameters stored in said parameter store and said previous motion vector;
   a dual primer for receiving said previous motion vector stored in said motion vector decoding means and generating a predetermined number of dual motion vectors; and
   a motion vector controller for controlling operations of the motion vector decoding circuit based on said parameters, and selecting one of said previous motion vector and dual motion vector, and outputting the selected one as a decoded motion vector.

2. The motion vector decoding circuit according to claim 1, wherein said parameters stored in said parameter store comprise a motion vector range determination code, a motion vector code and a motion vector residual code, said motion vector range determination code determines a motion vector range, and wherein said decoding circuit further comprises means for generating a plurality of difference data based on differences between said motion vectors, said plurality of difference data being divided into groups; and said motion vector code and said motion vector residual code are allocated to respective groups of said difference data.

3. The motion vector decoding circuit according to claim 2, wherein said motion vector decoding means comprises:
- pipeline structure for receiving said motion vector code from said parameter store, sequentially delaying said motion vector code, and outputting the delayed motion vector code;
- delta calculation means, receiving said delayed motion vector code, said motion vector residual code and said motion vector range determination code, and calculating a delta value;
- a delta determiner, coupled to an output of said delta calculation means, for selecting one of the delta value calculated in said delta calculation means and the motion vector code output from said pipeline structure, and outputting the selected one as a final delta value;
- a motion vector determiner, coupled to an output of said delta determiner, for outputting the stored previous motion vector or dividing the stored previous motion vector by "2" and adding the determined delta value and a sign bit of the motion vector code output from said pipeline means to the result, to generate a current motion vector; and
- a range controller, coupled to an output of said motion vector determiner, for controlling the range of the motion vector, by comparing the current motion vector determined in said motion vector determiner with the motion vector range based on said motion vector range determination code, said range controller comprising means for outputting the range controlled motion vector or outputting the range controlled motion vector after multiplying said range controlled motion vector by "2".

4. The motion vector decoding circuit according to claim 3, wherein said pipeline structure is composed of a plurality of delays, in which respective delays have a delay time of one clock pulse.

5. The motion vector decoding circuit according to claim 3, wherein said delta calculation means comprises:
- an absolute calculator for obtaining an absolute value of the motion vector code, and for subtracting "1" from the absolute value;
- a first delta calculator, responsive to said motion vector range determination code and said motion vector residual code, for subtracting "1" from said motion vector range determination code, left-shifting said motion vector residual code by one bit, multiply the left-shifted result by the output of said absolute calculator, and masking a portion of the motion vector residual code; and
- a second delta calculator for adding outputs of said first delta calculator and adding a carry input of "1" to the added result, to thereby calculate a delta value.

6. The motion vector decoding circuit according to claim 5, wherein each operation of said absolute calculator, said first delta calculator, said second delta calculator, said delta determination portion, said motion vector determination portion and said range controller is performed in units of one clock pulse.

7. The motion vector decoding circuit according to claim 6, wherein said motion vector decoding means decodes one motion vector in six clock periods of time and decodes n motion vectors in 6+(n−1) clock periods.

8. The motion vector decoding circuit according to claim 5, wherein said first delta calculator comprises means for subtracting "1" from said motion vector range determination code to obtain an effective bit number of said motion vector residual code, and for masking the remainder bit portion of said motion vector residual code as "0" except for a portion corresponding to the effective bit number.

9. The motion vector decoding circuit according to claim 7, wherein said first delta calculator receives said motion vector code output from a first delay of said pipeline structure and said motion vector range determination code output from said parameter store, and comprises means for performing a logical operation on said motion vector code output from the first delay and said motion vector range determination code when the motion vector code is "0" or the motion vector range determination code is "1", and means for outputting a result of the logical operation as a select signal for determining a delta value of said delta determiner.

10. The motion vector decoding circuit according to claim 9, further comprising a second delay for delaying the select signal output from said first delta calculator for one clock pulse during which said second delta calculator calculates the delta value, said delay being provided between said first delta calculator and said delta determiner.

11. The motion vector decoding circuit according to claim 10, wherein pipeline structure further comprises a third delay, and said delta determiner receives the calculated delta value output from said second delta calculator and the motion vector code output from said third delay of said pipeline structure, and said delta determiner comprises means for determining said motion vector code as a final delta value if the select signal has a first logical value, and determines said calculated delta value as a final delta value if the select signal has a second logical value.

12. The motion vector decoding circuit according to claim 11, wherein said delta determiner inverts individual bits constituting the determined delta value in order to reverse a sign bit of the determined delta value, if said motion vector is smaller than "0".

13. The motion vector decoding circuit according to claim 12, wherein said pipeline structure comprises a fourth delay, said fourth delay delaying the sign of the motion vector as a carry input of said motion vector determiner.

14. The motion vector decoding circuit according to claim 13, wherein said motion vector determiner comprises:
- a divider for dividing said previous motion vector by "2";
- output means for outputting said previous motion vector or outputting the divided previous motion vector; and
- an adder for adding the previous motion vector output from said output means and the delta value determined in said delta determiner, and adding the sign of the motion vector code which is a carry input to the added result, to calculate a current motion vector; wherein said pipeline structure comprises a fifth delay for delaying and outputting the calculated motion vector.

15. The motion vector decoding circuit according to claim 14, wherein said range controller comprises:
- a range control unit for receiving the current motion vector calculated via said fifth delay, comparing the received motion vector with the motion vector range by the motion vector range determination code read from said parameter store, adding the current motion vector to the motion vector range if the current motion vector is smaller than the minimum value of the motion vector range and subtracting the motion vector range from the current motion vector if the current motion vector is greater than the maximum value of the motion vector range; and a multiplier for outputing the range-controlled motion vector or multiplying the range-controlled motion vector by "2" and outputting the multiplied result under the control of said motion vector controller; wherein said pipeline structure comprises a sixth delay for delaying for delaying the output of said multiplier.

16. The motion vector decoding circuit according to claim 15, wherein said motion vector controller controls said divider in said motion vector determiner to divide the previous motion vector by "2" when the current motion vector is a vertical component of a field structure of a frame picture from said input parameter, and controls said multiplier in said range controller to multiply the range-controlled current motion vector by "2".

17. The motion vector decoding circuit according to claim 16, wherein said motion vector controller selects the dual motion vector applied from said dual primer when the kind of the motion vector is a predictive-picture (P-picture), and selects the previous motion vector applied from said motion vector decoding means when the kind of the motion vector is not a predictive-picture, to thereby output a decoded motion vector.

* * * * *